(12) United States Patent
Grantham, IV

(10) Patent No.: US 10,399,588 B1
(45) Date of Patent: Sep. 3, 2019

(54) RETRACTABLE WHEELCHAIR HANDLEBARS

(71) Applicant: Albert Gallatin Grantham, IV, Anderson, SC (US)

(72) Inventor: Albert Gallatin Grantham, IV, Anderson, SC (US)

( * ) Notice: Subject to any disclaimer, the term of this patent is extended or adjusted under 35 U.S.C. 154(b) by 0 days.

(21) Appl. No.: 16/118,697

(22) Filed: Aug. 31, 2018

(51) Int. Cl.
*A61G 5/14* (2006.01)
*B62B 5/06* (2006.01)
*A61G 7/10* (2006.01)

(52) U.S. Cl.
CPC ............ *B62B 5/067* (2013.01); *A61G 5/14* (2013.01); *B62B 5/065* (2013.01); *A61G 7/1094* (2013.01)

(58) Field of Classification Search
CPC ......... B62B 5/067; B62B 5/065; B62B 5/066; A61G 5/14; A61G 7/1094
See application file for complete search history.

(56) References Cited

U.S. PATENT DOCUMENTS

| | | | |
|---|---|---|---|
| 3,398,974 A | 8/1968 | Edwards et al. | |
| 3,584,890 A * | 6/1971 | Presty | A61G 5/14 280/304.1 |
| 3,708,182 A | 1/1973 | Markiel et al. | |
| 3,719,390 A * | 3/1973 | Haney | A61G 5/14 297/42 |
| 3,999,778 A | 12/1976 | Markiel | |
| 4,290,423 A | 9/1981 | Kleinwolterink | |
| 4,384,732 A | 5/1983 | Wierwille | |
| 4,759,562 A * | 7/1988 | Vinyard | A61G 5/10 280/304.1 |
| 4,934,725 A * | 6/1990 | Owens | A61G 5/14 280/304.1 |
| 4,948,156 A | 8/1990 | Fortner | |
| 5,419,571 A * | 5/1995 | Vaughan | A61G 5/10 280/250.1 |
| 5,480,173 A * | 1/1996 | Koniecko | A61G 5/12 280/250.1 |
| 7,500,689 B2 * | 3/2009 | Pasternak | A61G 5/10 280/250.1 |
| 8,066,332 B2 | 11/2011 | Huang | |
| 9,308,144 B2 * | 4/2016 | Derringer | A61G 5/14 |
| 9,962,303 B1 | 5/2018 | Wilson et al. | |
| 2009/0108561 A1 | 4/2009 | Barber et al. | |
| 2011/0006494 A1* | 1/2011 | Walker | A61G 5/08 280/7.17 |
| 2016/0022517 A1 | 1/2016 | Frangos et al. | |
| 2016/0367417 A1 | 12/2016 | Ramirez | |

* cited by examiner

*Primary Examiner* — Vicky A Johnson
(74) *Attorney, Agent, or Firm* — Burr & Forman LLP; Douglas L. Lineberry

(57) ABSTRACT

Wheelchair handlebars coupled to a pair of arm rests of a wheelchair. Each of the handlebars include an outer bar defining an internal slot, an inner bar slidably engaged within the internal slot of the outer bar, and a lock configured to releasably lock the outer bar to the inner bar.

16 Claims, 4 Drawing Sheets

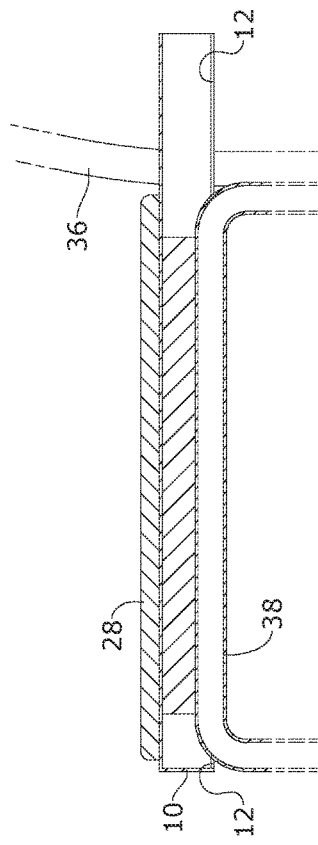
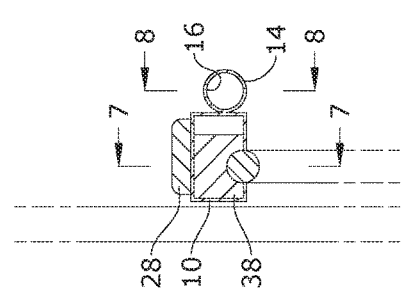
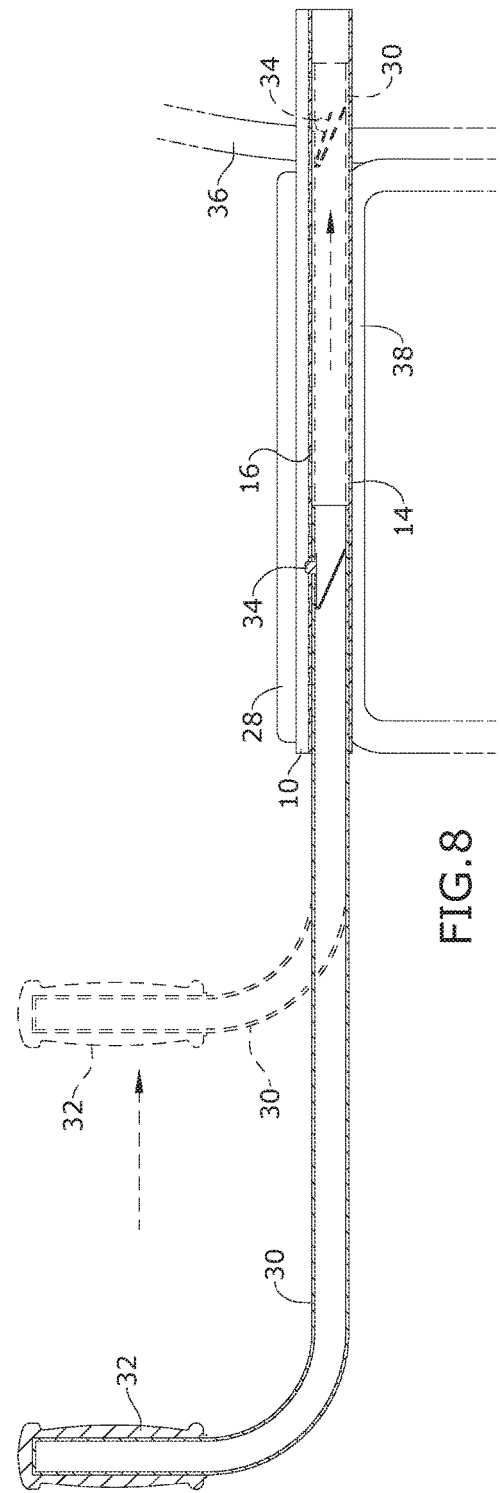

RETRACTABLE WHEELCHAIR HANDLEBARS

BACKGROUND OF THE INVENTION

The present invention relates to wheelchairs and, more particularly, to retractable wheelchair handlebars.

A wheelchair is a chair with wheels, used when walking is difficult or impossible due to illness, injury, or disability. Due to various medical conditions, age, and weakness, some people are not able to stand up from a seated position. In such situations, it may be very difficult for people to stand up from their wheelchair without assistance from another person.

As can be seen, there is a need for a device that helps wheelchair users to stand up from their sitting position.

SUMMARY OF THE INVENTION

In one aspect of the present invention, a wheelchair comprises: a frame; plurality of wheels rotatably coupled to the frame; a seat coupled to the frame; a pair of arm rests coupled to the frame and disposed on either side of the seat; and a pair of handlebars coupled to the pair of arm rests, wherein each of the handlebars comprise: an outer bar defining an internal slot; an inner bar slidably engaged within the internal slot of the outer bar; and a lock configured to releasably lock the outer bar to the inner bar.

In another aspect of the present invention, a handlebar adapter comprises: a sleeve comprising an upper surface, a lower surface, and sidewalls, wherein a channel is defined along a length of the lower surface; an outer bar coupled to the sleeve and defining an internal slot; an inner bar slidably engaged within the outer bar; and a lock configured to releasably lock the outer bar to the inner bar, wherein the sleeve is configured to fit over an arm rest of a wheelchair.

These and other features, aspects and advantages of the present invention will become better understood with reference to the following drawings, description and claims.

BRIEF DESCRIPTION OF THE DRAWINGS

FIG. 6 is a section view of the present invention taken along line 6-6 of FIG. 2;

FIG. 7 is a section view the present invention taken along line 7-7 of FIG. 6;

FIG. 8 is a section view of the present invention taken along line 8-8 of FIG. 6.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes retractable and extendable handle bars for a wheelchair to help people stand. Using the present invention, people are able to extend the handlebars and pull themselves up into a standing position.

Figure 1:
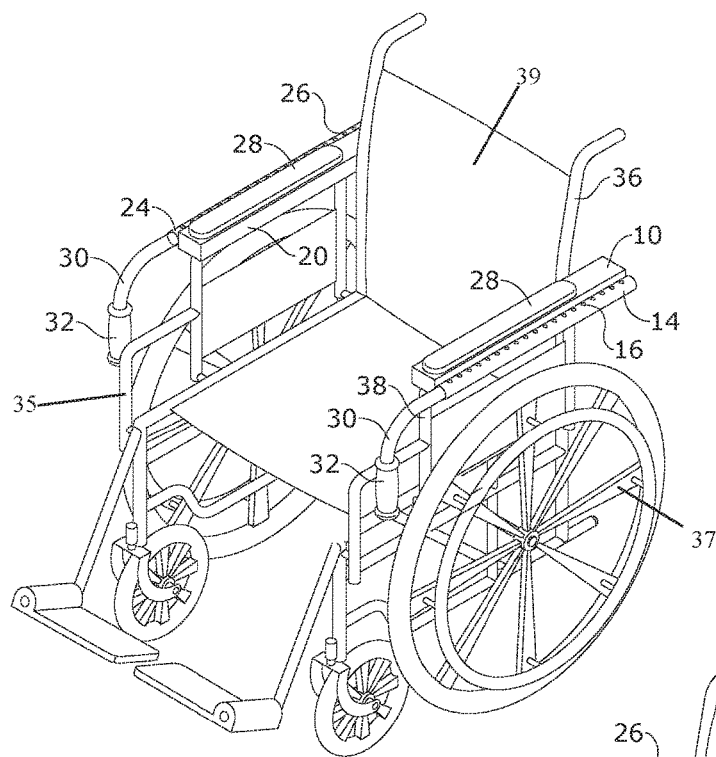
FIG. 1 is a perspective view of an embodiment of the present invention, shown with handlebars in a retracted position.
Figure 2:
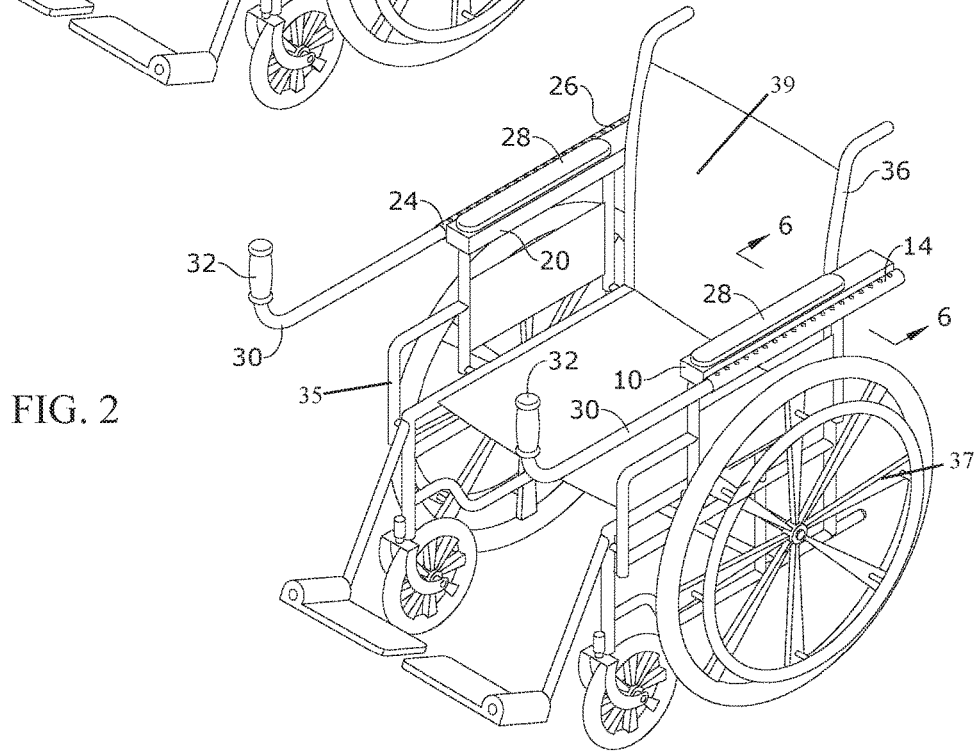
FIG. 2 is a perspective view of an embodiment of the present invention, shown with handlebars in an extended position.
Figure 3:
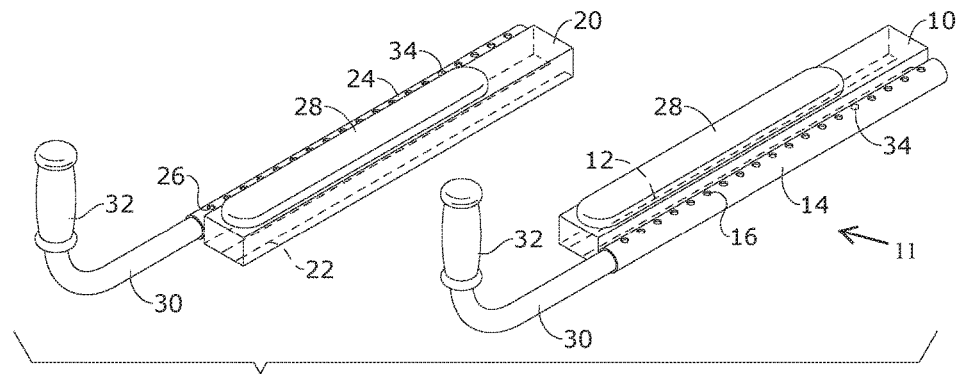
FIG. 3 is a top perspective view of a handlebar assembly of an embodiment of the present invention.
Figure 4:
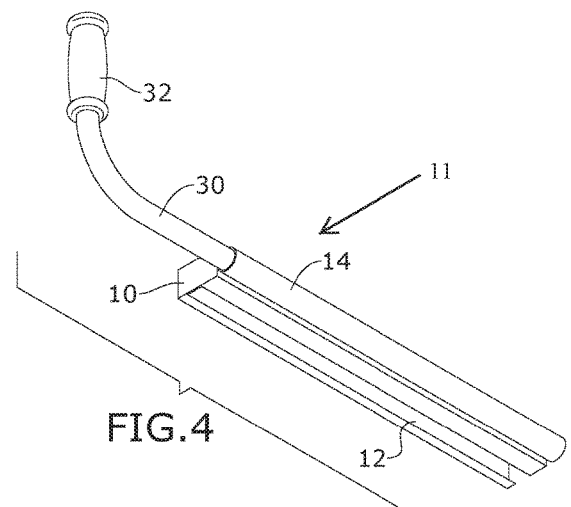
FIG. 4 is a top perspective view of a handlebar assembly of an embodiment of the present invention.
Figure 5:
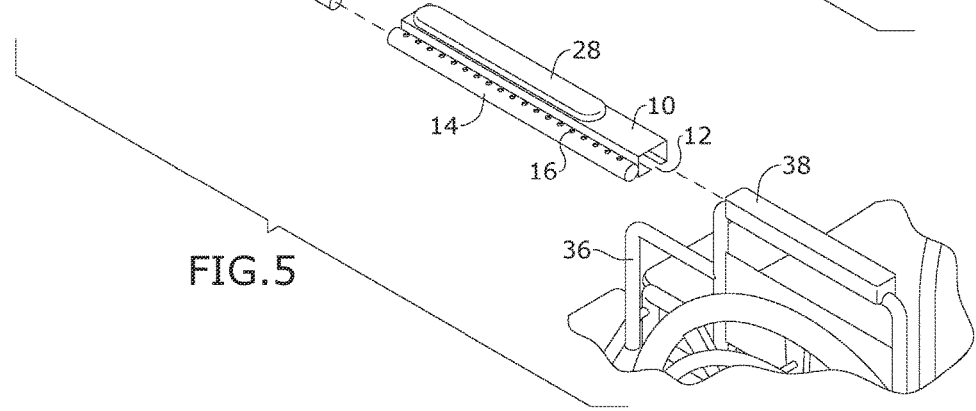
FIG. 5 is an exploded view of a handlebar assembly of an embodiment of the present invention.
Figure 9:
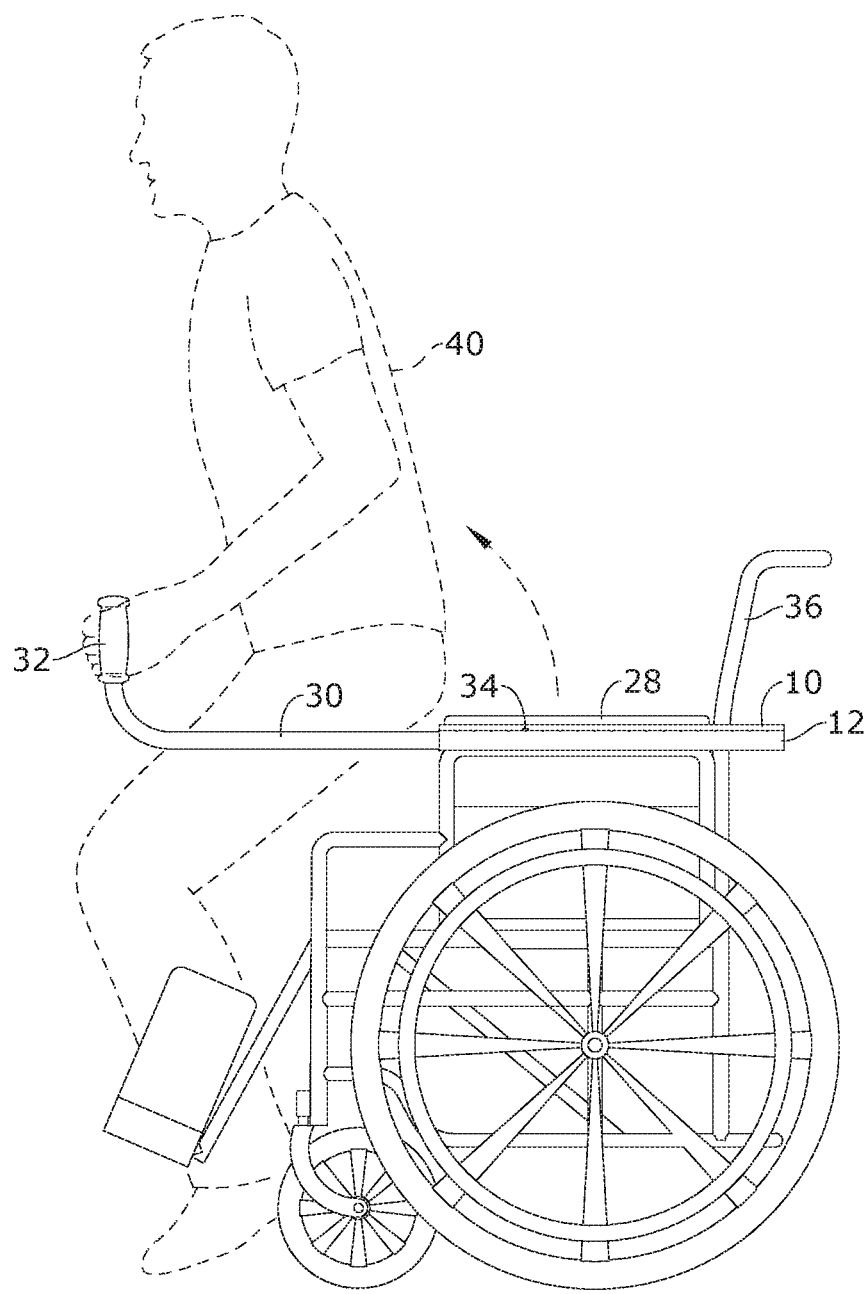
FIG. 9 is a side view of an embodiment of the present invention, shown in use with handlebars in an extended position.

Referring to FIGS. 1 through 9, the present invention a wheelchair handlebars 11. A wheelchair 36 includes a frame 35. A plurality of wheels 37 are rotatably coupled to the frame 35. A seat 39 is coupled to the frame 35. A pair of arm rests 38 are coupled to the frame 35 and disposed on either side of the seat 39. The handlebars 11 are coupled to the pair of arm rests 38. Each of the handlebars 11 include an outer bar 14, 24 defining an internal slot, an inner bar 30 slidably engaged within the internal slot of the outer bar 14, 24 defining an internal slot, an inner bar 30 slidably engaged within the internal slot of the outer bar 14, 24 and a lock 16, 34 configured to releasably lock the outer bar 14, 24 to the inner bar 30.

The inner bar 30 of the handlebars 11 extend from the wheelchair 36 in front of and on either side of the wheelchair seat 39, allowing a user 40 to grasp the handlebars 11 while standing up. In certain embodiments, the handlebars 11 may include a handle grip 32 at the distal end of the inner bar 30. The handle grip 32 may be formed be a bend in the inner bar 30 and may be substantially perpendicular to the inner bar 30. The handle grip 32 may further include a foam or rubber padding.

In certain embodiments, the outer bar 14, 24 and the inner bar 30 are cylindrical, which allows the inner bar 30 to rotate within the outer bar 14, 24 along a longitudinal axis. In such embodiments, the handle grip 32 may be faced downwards when the inner bar 30 is recessed within the outer bar 14, 24. When in use, the inner bar 30 is extended from the outer bar 14, 24, the inner bar 30 is rotated along the longitudinal axis until the handle grip 32 is facing upwards, and the lock 16, 26, 34 is activated to lock the inner bar 30 relative to the outer bar 14, 24.

In certain embodiments, the lock 16, 26, 34 may include a plurality of openings 16, 26 formed along a length of the outer bar 14, 24 and a spring button 34 protruding from the inner bar 30. In such embodiments, the inner bar 30 is extended from the outer bar 14, 24, the inner bar 30 is rotated along the longitudinal axis until the handle grip 32 is facing upwards, and the spring button 34 aligns with and pops into one of the openings 16, 26, thereby releasably locking the inner bar 30 to the outer bar 14, 24. When converting the handlebars 11 to a retracted position, pressure is applied against the spring button 34, the inner bar 30 is rotated relative to the outer bar 14, 24 so that the handle grips 32 are facing downward and the inner bar 30 slides back into the outer bar 14, 24.

The handlebar 11 may be a handlebar adapter that fits over existing wheelchairs 36. The present invention may include both a left handlebar adapter and a right handle bar adapter. The left handlebar adapter includes a left sleeve 10 having an upper surface, a lower surface, and sidewalls. A left channel 12 is defined along a length of the lower surface. The left outer bar 14 is coupled to the left sleeve 10. The left outer bar 24 includes the left plurality of openings 26 formed along its length. The right handlebar 11 includes a right sleeve 20 having an upper surface, a lower surface, and sidewalls. A right channel 22 is defined along a length of the lower surface. The right outer bar 24 is coupled to the right sleeve 20. The right outer bar 24 includes the right plurality of openings 16 formed along its length. A padding 28 may be coupled to the upper surface of each of the sleeves 10, 20. The sleeves 10, 20 are configured to fit over an arm rest 38 of the wheelchair 36.

It should be understood, of course, that the foregoing relates to exemplary embodiments of the invention and that modifications may be made without departing from the spirit and scope of the invention as set forth in the following claims.

What is claimed is:

1. A wheelchair comprising:
    a frame;
    a plurality of wheels rotatably coupled to the frame;
    a seat coupled to the frame;
    a pair of arm rests coupled to the frame and disposed on either side of the seat;
    a pair of handlebars coupled to the pair of arm rests:
    a handlebar adapter further comprising:
        a sleeve comprising an upper surface, a lower surface, and at least one sidewall, wherein a channel is defined along a length of the lower surface; and
        an outer bar coupled to the sleeve and defining an internal slot;
        an inner bar slidably engaged within the outer bar; and
        a lock configured to releasably lock the outer bar to the inner bar,
        wherein the sleeve is configured to fit over an arm rest of a wheelchair.

2. The wheelchair of claim 1, wherein each of the handlebars further comprise a handle grip at the distal end of the inner bar, wherein the handle grip is substantially perpendicular to the inner bar.

3. The wheelchair of claim 1, wherein the outer bar and the inner bar are cylindrical, wherein the inner bar is capable of rotating within the outer bar along a longitudinal axis.

4. The wheelchair of claim 1, wherein the lock comprises:
    a plurality of openings formed along a length of the outer bar; and
    a spring button protruding from the inner bar.

5. A handlebar adapter comprising:
    a sleeve comprising an upper surface, a lower surface, and sidewalls, wherein a channel is defined along a length of the lower surface;
    an outer bar coupled to the sleeve and defining an internal slot;
    an inner bar slidably engaged within the outer bar; and
    a lock configured to releasably lock the outer bar to the inner bar,
    wherein the sleeve is configured to fit over an arm rest of a wheelchair.

6. The handlebar adapter of claim 5, comprising a left handlebar adapter and a right handlebar adapter.

7. The handlebar adapter of claim 5, further comprising a padding coupled to the upper surface of the sleeve.

8. The handlebar adapter of claim 5, further comprising a handle grip at the distal end of the inner bar and substantially perpendicular to the inner bar.

9. The handlebar adapter of claim 5, wherein the outer bar and the inner bar are cylindrical, wherein the inner bar is capable of rotating within the outer bar along a longitudinal axis.

10. The handlebar adapter of claim 5, wherein the lock comprises:
    a plurality of openings formed along a length of the outer bar; and
    a spring button protruding from the inner bar.

11. A lift assist handlebar comprising:
    a sleeve comprising an upper surface, a lower surface, and at least one sidewall, wherein a channel is defined along a length of the lower surface;
    an outer bar coupled to the sleeve and defining an internal slot;
    an inner bar slidably engaged within the outer bar;
    a lock configured to releasably lock the outer bar to the inner bar,
    wherein the sleeve is configured to fit over an arm rest; and
    the inner bar is capable of rotating within the outer bar along a longitudinal axis to position a handle grip in a down position and an up position.

12. The lift assist handlebar of claim 11, wherein the handle grip remains substantially perpendicular to the inner bar in the up and down positions.

13. The lift assist handlebar of claim 11, wherein the inner bar extends and retracts with respect to the outer bar via sliding within the outer bar.

14. The lift assist handlebar of claim 11, wherein the outer bar contains a plurality of openings along a length and the inner bar locks into one of the plurality of openings to change the length of the inner bar extending from the outer bar.

15. The lift assist handlebar of claim 11, wherein having at least two sidewalls.

16. The lift assist handlebar of claim 11, wherein the lock releasably locks the outer bar to the inner bar in either an up or down position.

* * * * *